June 26, 1951  T. O. KOSATKA  2,558,183
SPLIT SEAL
Filed April 7, 1947  2 Sheets-Sheet 1
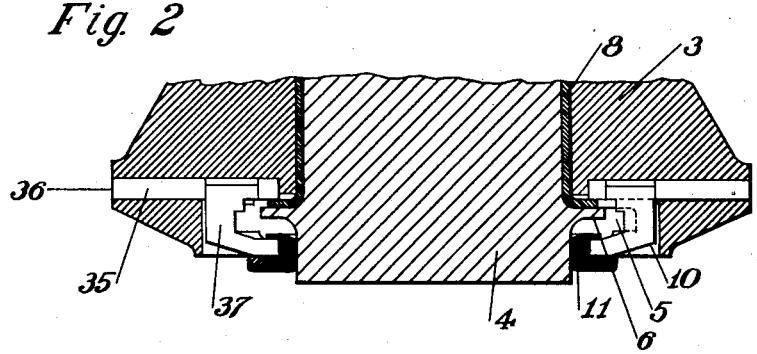
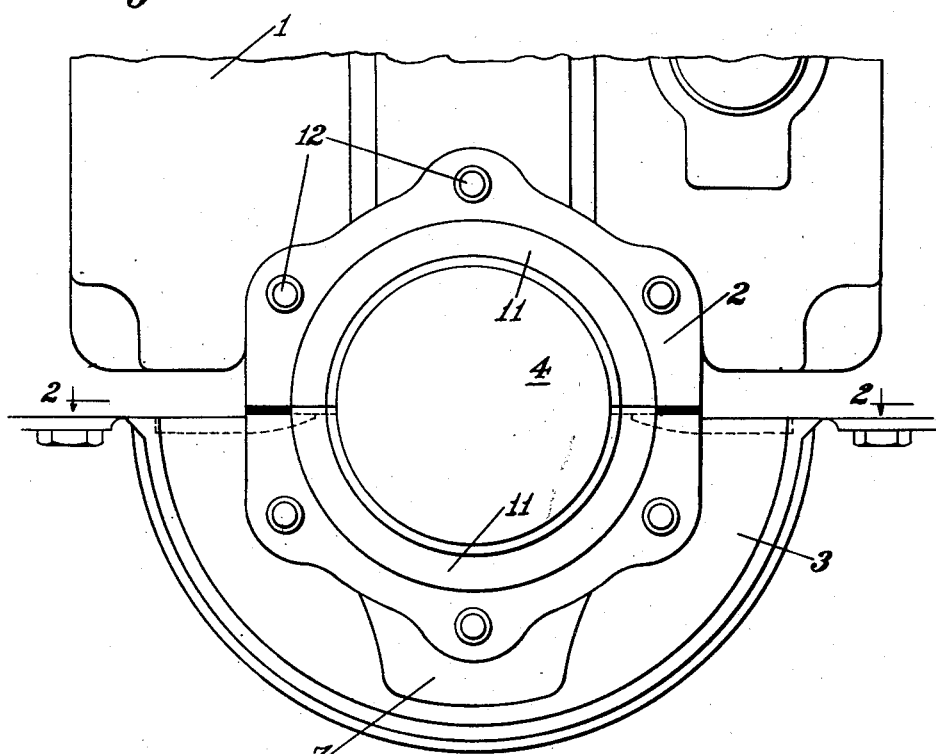
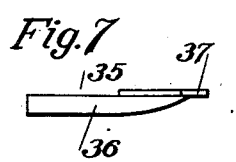
Thomas O. Kosatka INVENTOR
BY George J. Haight
ATTORNEY June 26, 1951 T. O. KOSATKA 2,558,183
SPLIT SEAL
Filed April 7, 1947 2 Sheets-Sheet 2
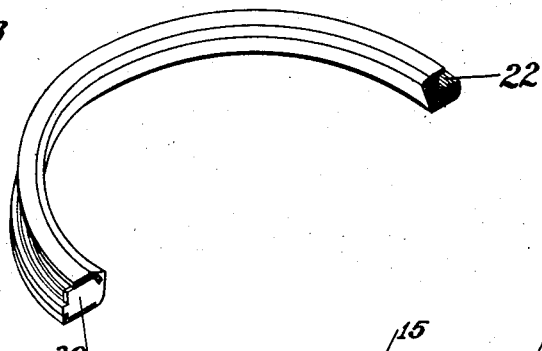
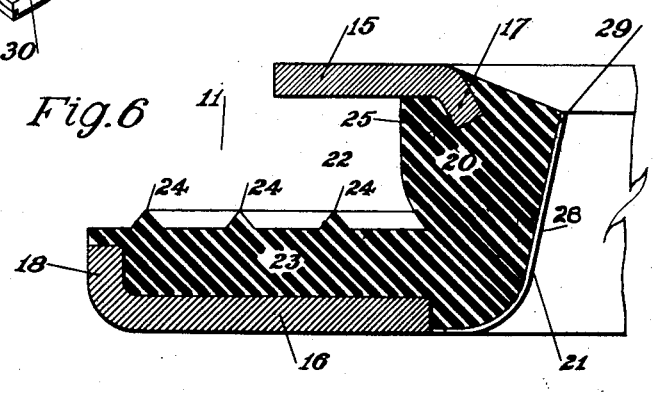
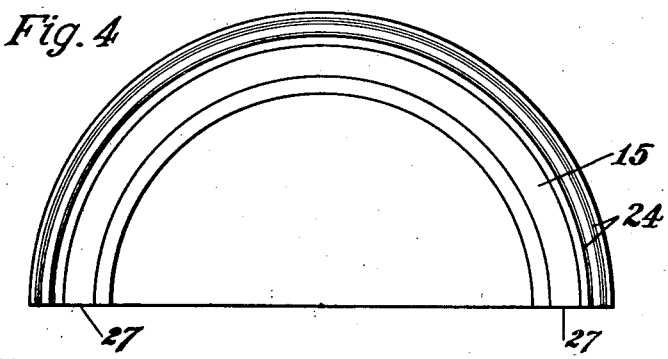
Thomas O. Kosatka INVENTOR
BY George T. Haight
ATTORNEY Patented June 26, 1951

2,558,183

UNITED STATES PATENT OFFICE 2,558,183

SPLIT SEAL

Thomas O. Kosatka, Chicago, Ill., assignor to Victor Manufacturing & Gasket Co., Chicago, Ill., a corporation of Illinois Application April 7, 1947, Serial No. 739,899

12 Claims. (Cl. 286—5)

This invention relates to split seals for preventing fluids within a housing from escaping therefrom along a rotating shaft that projects out of the housing, and has for its principal object the provision of a new and improved seal of this kind.

It is a main object of the invention to provide a seal that can be manufactured at low cost without sacrificing quality and can be installed and removed economically.

Another object of the invention is to provide an oil seal for mounting on the rear main bearing of an internal combustion engine to prevent escape of oil along the crankshaft of the engine.

Another object of the invention is to provide a sealing unit that can be used as a replacement unit on existing engines as well as an original sealing unit on a new engine.

Another object of the invention is to provide a seal composed of identical complementary parts which may be mounted in and supported on the bearing units without the use of auxiliary fastening devices such as bolts or screws.

Further objects of the invention not specifically mentioned here will be apparent from the detailed description and claims which follow, reference being had to the accompanying drawings in which a preferred embodiment of the invention is shown by way of example, and in which:

Fig. 1 is an end elevational view of an engine showing the seal applied thereto;

Fig. 2 is a fragmentary plan view of the engine taken substantially along the line 2—2 of Fig. 1, looking in the direction of the arrows;

Fig. 3 is a perspective view of a sealing element;

Fig. 4 is a plan view of a preferred form of sealing element;

Fig. 5 is an end view of the element shown in Fig. 4;

Fig. 6 is a cross sectional view of the sealing element drawn to an enlarged scale; and Fig. 7 is an elevational view of the bearing sealing member.

In many devices, such as internal combustion engines for example, rotating shafts project from a housing which contains a fluid such as lubricating oil, and if special means are not provided to seal the shaft, the oil will travel therealong and leak out of the housing. In the prior art of which I am aware, various sealing devices have been provided to seal such shafts and thereby retain the fluid in the casing. In Patent #2,209,578 there is shown a split seal adapted to be mounted upon the two elements of the rear main bearing of an internal combustion engine and to engage the crankshaft projecting through this bearing and out of the crankcase, to receive the flywheel and other devices. It is to a seal of this type that the instant invention particularly relates, although its use is not limited to internal combustion engines herein shown and described by way of example.

In an internal combustion engine, the rear main bearing is composed of two members, the upper one of which is formed as an integral part of the engine block and the lower member is registered therewith and bolted thereto to engage and support the crankshaft. Each of these bearing members contains a groove near its outer end, which groove opens inwardly towards the center of the bearing and shaft to fit over a slinger ring located on the crankshaft. The outer edge of this groove is formed by a flangelike wall that projects towards the shaft and terminates radially outwardly of the shaft an appreciable distance. It is in this space between this flangelike wall and the shaft that the sealing elements of the prior art and of the instant invention are applied to the engine.

In the above mentioned patent, the sealing element is attached to the bearing members by stud bolts and project beyond the flangelike portion of those members into close proximity to the shaft and contains at its inner edge a resilient oil-resistant member which engages the shaft to form a seal therewith. The two complementary members of the sealing device abut together and are drawn into engagement, one with the other, as the lower movable bearing member is drawn into engagement with the upper bearing member.

The sealing device of the present invention, like the device of the above patent, is formed in two complementary parts which are identical and which are adapted to engage and to be supported by the flangelike wall of the bearing members without the use of auxiliary fastening means such as bolts or studs.

The ends of the sealing elements abut together and are drawn into firm engagement, one with the other, as the lower bearing member is tightened against the upper bearing member. This abutment of the complementary sections of the sealing device forces those sections into tight seal-forming engagement with the flanges upon which they are mounted, so that when the bearing is tightly in place the seal is also tightly in place and ready for use.

Referring now to the drawings in more detail, particularly Figs. 1 and 2, where a fragmentary portion of an internal combustion engine is shown by way of example and comprises a block section 1, having an upper main rear bearing element 2 that is engaged by a lower main bearing element 3 to support the crankshaft 4 which projects therefrom out of the crankcase. The main bearing members 2 and 3 each contain a groove or channel 5, best seen in Fig. 2, into which is projected the slinger ring 6 on the crankshaft, so that oil traveling along the crangkshaft through the main bearing units will be thrown from the crankshaft into this groove and returned to the crankcase through a cannel 7 located in the lower main bearing unit 3. As will be seen in Fig. 2, the main bearing units 2 and 3 are lined with a suitable anti-friction lining material 8 that engages the shaft in the usual manner.

The inwardly opening slinger ring groove 5 is defined by a flangelike outer wall 10 that projects radially inwardly and is terminated a considerable distance from the crankshaft 4. The sealing device 11 of the present invention is supported on this flangelike wall 10 and engages the shaft to form a sealing connection thereto.

As will be seen in Fig. 1, the main bearing members 2 and 3 are shown to contain threaded openings 12 which are adapted to receive the bolts by which the sealing element of the above mentioned patent is attached to the engine.

As will be seen in Figs. 4, 5 and 6, in its preferred form the sealing device 11 of the present invention comprises semi-circular annular rings 15 and 16. Around the inner edge of the ring 15 is a flange 17 that projects inwardly at an angle to the face of the ring. Ring 16 contains a flange 18 at its outer edge, which flange 18 projects at substantially right angles to the plane of the ring.

Extending between plates 15 and 16, and encompassing the flange 17 and extending along the ring 16 into engagement with the flange 18 thereon, is a mass of rubberlike material 20 which is bonded to the flange 17 and ring 16 and flange 18 thereon. The particular type of rubberlike material will, of course, depend upon the specific use to which the sealing element is to be put, and in the case of an oil seal for an internal combustion engine the material may be an oil-resistant compounded elastomer capable of withstanding temperatures such as are encountered in internal combustion engines. Preferably the elastomer is one having a relatively low coefficient of friction so that its engagement with a shaft will not produce an appreciable drag; however, if desired, the shaft-engaging face of the element 20 may be equipped with a fabric or other friction-reducing membrane 21 suitably bonded thereto.

Projecting into the channel-like groove 22 that is bounded on one side by the annulus 15 and on the other side by the portion 23 of the elastomer 20 that is in engagement with the face of the ring 16, are a plurality of concentric rings 24, shown to be of triangular cross section. In installing the sealing element in the engine, ring 15 fits inside of the flangelike walls 10 thereof, and the portion 23 engages the outer face of this flangelike wall. Because of manufacturing tolerances in the manufacture of internal combustion engines, the thickness of this flangelike wall 10 will vary over a considerable range, and the height of the concentric projections 24 is such that their apexes are located in a plane parallel to the plane of the inner face of the ring 15 and spaced from the latter plane a distance less than the minimum thickness likely to be encountered in the flange walls 10. The concentric rings or bosses 24 are therefore deformed and compressed as the sealing element 11 is registered with the flange wall. If the thickness of the flange wall is greater than minimum, the rings 24 are compressed to a greater degree.

That portion of the rubberlike material 20 which forms the bottom of the groove 22 contains a compression ridge 25 which has a cylindrical portion disposed adjacent the arcuate plate 15 and curves inwardly of the material adjacent the portion 23, the radius of this ridge being greater than the radius of the inner edge of the flange wall 10 on the bearing members. As a result of this construction, as the sealing element is registered with the flange wall, compression ridge 25 engages the edge of that wall before the sealing element is positioned with its center coinciding with the center of the bearing element and shaft. The ends 27 of the sealing element are thus made to project slightly beyond the ends of the bearing elements.

In assembling the sealing element in an internal combustion engine, such as is shown in the drawing, the element 11 is placed in the upper bearing element 2 before the crankshaft is registered therewith, and the lower sealing element 11 is placed in the bearing section 3 before that section is registered with the upper section. As the bolts, not shown, by which the two bearing elements are drawn into engagement with each other and the shaft, are being tightened, the ends 27 of the two sealing elements 11 will engage each other before the bearing elements engage each other, and consequently further drawing together of the bearing elements will move the sealing elements into final position in the bearing elements, in which position the center of the sealing element will coincide with the center of the bearing element and shaft. This movement causes a compression of the compression ridge 25 against the inner edge of the flange 10 which insures a fluid-tight seal between this inner edge and the sealing unit.

The rubberlike material 20 projects radially inwardly from the inner edges of rings 15 and 16 and the flange 17, and terminates on a frusto-conical surface 28, disposed with its smaller diameter adjacent the flange 17. This forms a lip 29 that has an inner radius less than the radius of the shaft, so that as the sealing element is brought into engagement with the shaft the lip will be forced outwardly and the rubberlike material in it compressed between the shaft and the flange 17. This forms a tight seal with the shaft and insures that fluid, such as oil traveling therealong, will not escape from the crankcase.

The rubberlike material 20 is sufficiently resilient that the lip 29 of the sealing element can follow slight imperfections or eccentricities in the shaft and maintain a sealtight engagement therewith. The rotation of the shaft will subject the sealing elements 11 to torque tending to rotate them with respect to the flange wall 10 as the shaft rotates. However, the frictional engagement between the plate 15 and rubberlike material 20, and the flange wall 10, is sufficient to resist this torque and prevent rotation of the sealing element.

As will be seen in Fig. 5, the groove 22 in the preferred embodiment of the invention is continuous and extends uninterrupted through the two sealing elements engaging the shaft. In certain instances, however, it may be advantageous to interrupt this groove, and in Fig. 3 there is shown a modification in which a wall 30 is extended radially outwardly from the main mass of rubberlike material 20 across the end of the groove 22 to block off that groove. This wall 30, which will fit in corresponding recess in the flange wall 10, serves as an additional means for preventing rotation of the sealing elements with respect to the bearing members; however, in most instances, the provision of a wall of this kind is not necessary to prevent rotation of the element.

From the foregoing, it will be seen that after the two sections of the bearing have been drawn into tight engagement with each other, the sealing element is forced into tight seal-forming engagement with the flange walls of the bearing elements and also seals with the crankshaft. In most engines, however, the bearing structure is such that additional sealing means are employed to insure complete retention of the fluid within the crank case.

In Figs. 2 and 7, there are shown sealing elements 35 having a body portion 36 that fits within a groove in the lower main bearing structure 3 and contains an armlike portion 37 that extends outwardly and radially inwardly into the groove 22 where it engages the inner ring 15, the compression ridge 25, and the side portion 23 of the rubberlike material of the sealing element. This auxiliary sealing device is formed of an oil-resistant compressible elastomer and as the bearing members are drawn together is squeezed into tight seal-forming engagement therewith and with the sealing elements to complete the sealing of the crank case.

As will be seen in Figure 2, sealing elements 35 are made in rights and lefts to fit properly on opposite sides of the crankshaft 4. The material in the elements is preferably somewhat softer than the material 20 in the sealing elements and therefore it is readily deformed and compressed into seal-forming engagement with the various parts it engages. In cases where the sealing members are of the types shown in Figure 3 the arms 37 of the elements 35 are abutted against the outer ends of the walls 30.

In the case of an internal combustion engine, the crankshaft usually contains an outwardly extending flange to which the flywheel of the engine is bolted, and in case of failure of the sealing device replacement of the devices of the prior art has been difficult because of the presence of the flywheel. The device of the instant invention can be more easily replaced by removing the lower half 3 of the main bearing and then rotating the upper half of the sealing element 11 around the shaft and out of engagement with the flange wall 10 of the upper main bearing. A new sealing element is positioned by a similar movement; and after a new element has been fitted in the lower section of the main bearing, the two bearing members are secured together to complete the installation of the new sealing devices.

From the foregoing, it will be apparent that the split seal of the present invention possesses many advantages. It can be manufactured at a lower cost without sacrificing quality, and it can be installed on an engine more cheaply than the devices of the prior art. It forms a sealtight connection with the rotating crankshaft and is capable of maintaining such connection over a long period of time without attention. The device of the present invention is interchangeable with prior art devices and capable of being used as replacements therefor.

While I have illustrated and described the sealing device as applied to the rear main bearing of an internal combustion engine, I have done so by way of example, as the device may be put to a number of other uses in devices such as pumps, compressors, and the like, and I am not to be limited to the precise details shown and described by way of example, as there are many modifications and adaptations which can be made by one skilled in the art within the teachings of the invention.

Having thus complied with the statutes and shown and described the preferred embodiment of my invention, what I consider and desire to have patented by Letters Patent is pointed out in the appended claims.

What is claimed is:

1. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall and to form a seal therewith, and a lip formed in said rubberlike material and extending radially inwardly from said plates to engage the shaft and form a seal therewith.

2. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall, an outwardly extending edge projecting into said channel and adapted to be compressed by the housing wall to form a seal therewith, and a lip formed in said rubberlike material and extending radially inwardly from said plates to engage the shaft and form a seal therewith.

3. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall and to form a seal therewith, concentric ribs on said rubber like material projecting into said channel and adapted to be compressed by the housing wall to hold the seal thereon and to form a seal therewith, and a lip formed in said rubberlike material and extending radially inwardly from said plates to engage the shaft and form a seal therewith.

4. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall, an outwardly extending ridge projecting into said channel from the closed end thereof, concentric ridges projecting into said channel from one side thereof, said ridges being adapted to be compressed by the housing wall to hold the unit thereon and to form a seal therewith, and a lip formed in said rubberlike material and extending radially inwardly from said plates to engage the shaft and form a seal therewith.

5. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall and to form a seal therewith, and a lip formed in said rubberlike material and projecting radially inwardly from said plates, the inner edge of said lip having a radius less than the radius of the shaft so that the material in the lip is compressed by the shaft to form a seal therewith.

6. A split seal for sealing a shaft that projects from a two piece housing with its axis in the plane of parting of the housing pieces, comprising, complementary semi-circular members each comprising, a pair of annular plates having inside radii greater than the radius of the shaft, said plates being parallel to and spaced from each other, a flange on the inside edge of one of said plates, a flange on the outside edge of the other plate, each of said flanges extending in the direction of the other plate, a rubberlike material encompassing said inside edge flange and extending across the space between said plates and alongside of said other plate into engagement with said outside edge flange, said rubberlike material being bonded to said plates and flanges, said first plate and rubberlike material defining an outwardly opening channel adapted to engage a housing wall and to form a seal therewith, said rubberlike material projecting radially inwardly from the inside edges of said plates and terminating on the surface of a truncated cone disposed with its smaller radius adjacent to said inside edge flange, which smaller radius is smaller than the radius of the shaft so that the material is compressed between the shaft and said inner edge flange to form a fluidtight seal with the shaft.

7. A seal for closing the space between complementary housing members which together form a circular opening through which a rotatable shaft projects concentrically to seal a fluid within said housing and around said shaft comprising, a pair of semi-circular plates engaging the inside faces of said housing members adjacent to said opening, a flange on the inner edge of each of said plates projecting into the space between said members and said shafts, a second pair of semi-circular plates disposed around said shaft and in juxtaposition to the outer faces of said members adjacent said opening, a mass of rubberlike material bonded to said plates and encompassing said flanges and engaging the inner opening defining edges of said members and the outer faces of the members adjacent said opening to form sealtight joints therewith, and a lip on said mass of material engaging said shaft and compressed thereagainst by said flanges to form a fluidtight joint therewith.

8. A seal for closing the space between complementary housing members which are drawn together to form a circular opening through which a rotatable shaft projects concentrically to seal a fluid within said housing and around said shaft, comprising; complementary seal members each comprising inner and outer semi-annular plates, the inner one of which engages the inner faces of said members adjacent to said opening, a mass of rubberlike material bonded to said plates and engaging the opening defining edge of and the outer surrounding faces of said members, a lip on said mass of rubberlike material projecting inwardly from the inner edges of said plates and engaging said shaft, said masses of rubberlike material being compressed against said members and said lips being compressed against said shaft as the members are drawn together to form fluidtight joints between the housing and seal and between the seal and shaft.

9. A split oil seal for sealing a shaft that extends through complementary bearing members which have flange-like walls extending radially inwardly towards the shaft, comprising; identical complementary sealing members each comprising a metal annulus engaging the inner face of the wall, a flange on said annulus projecting into the space between the wall and shaft, a mass of rubberlike material encompassing said flange and bonded thereto and extending across the inner edge of said wall and radially outwardly over the outer face thereof, a metal annulus disposed outside of the radially extending wall of said rubberlike material to which annulus the rubberlike material is bonded, concentric ridges on the inner face of said radially extending wall deformed as the sealing member is forced onto said flange-like wall to secure the sealing member thereon against rotation with respect thereto and to form a fluidtight seal between the rubberlike material and the flange-like wall, and a lip formed in said rubberlike material and engaging the shaft to form a fluidtight seal therewith.

10. A seal for sealing a shaft that projects through two separable members each of which has a radially inwardly extending flange-wall, comprising; complementary semi-circular members each of which comprises, a pair of annular plates, a rubberlike material bonded to said plates, and forming the bottom and one side of an outwardly opening channel that is bounded on the other side by one of said plates, said complementary members fitting over said flange walls and the ends of said annular plates butting together as the separable members are drawn together to force said rubberlike material into supporting and sealing engagement with said flange walls, and means on the complementary members engaging the shaft to form a sealing engagement therewith.

11. The combination with a pair of complementary housing members which are drawn together to form a cylindrical opening encircling a shaft that extends therebeyond, which members are recessed at one end to form a groove which is terminated at its outer end by flangelike walls of said members, projecting radially inwardly and terminating upon a cylinder of diameter greater than the diameter of the shaft; of sealing means comprising: complementary seal units each consisting of a pair of flanged semi-circular metal plates; a body of rubberlike material bonded to said plates and extending therebetween to form therewith an outwardly opening channel fitting over one of said flangelike walls to support the unit thereon, said body of rubberlike material being compressed against said wall and cylinder as said members are drawn together to form a fluidtight seal therewith; and a lip-like portion of said rubberlike material engaging the shaft to form a fluidtight seal between the shaft and said seal unit.

12. The combination with a pair of complementary housing members which are drawn together to form a cylindrical opening that encircles a shaft that extends therebeyond, which members are recessed at one end to form a groove encircling the shaft to receive a slinger ring thereon, which groove is terminated at its outer end by flangelike walls of said members projecting radially inwardly and terminating upon a cylinder whose diameter is greater than the diameter of the shaft, of a sealing means comprising: complementary seal units engaging the inner and outer faces of said flangelike walls to support the seal units thereon, a mass of compressible rubberlike material compressed against the cylindrical innermost face of the flangelike members as the housing members are drawn together to form a fluidtight seal between the complementary seal units and the housing members, a lip-like portion of said compressible material engaging the shaft to form a fluidtight seal between the shaft and said complementary seal units, and compressible members recessed into one of said complementary housing members and engaging the other housing member and said complementary seal units and compressed by the housing members as the said members are drawn together to form a fluidtight seal between the two housing members.

THOMAS O. KOSATKA.

REFERENCES CITED

The following references are of record in the file of this patent:

UNITED STATES PATENTS

| Number | Name | Date |
|---|---|---|
| Re. 17,322 | Eveno | June 11, 1929 |
| 2,146,677 | Johnson | Feb. 7, 1939 |
| 2,209,578 | Rainey et al. | July 30, 1940 |
| 2,480,116 | Brummer | Aug. 30, 1949 |